United States Patent
Sze et al.

(10) Patent No.: US 8,176,205 B2
(45) Date of Patent: May 8, 2012

(54) METHOD, SERVER AND SYSTEM FOR OPTIMIZING HTML-BASED CONTENT

(75) Inventors: David Sze, Kitchener (CA); Gerhard Klassen, Waterloo (CA); David Tapuska, Waterloo (CA)

(73) Assignee: Research In Motion Limited, Waterloo (CA)

( * ) Notice: Subject to any disclaimer, the term of this patent is extended or adjusted under 35 U.S.C. 154(b) by 580 days.

(21) Appl. No.: 12/031,083

(22) Filed: Feb. 14, 2008

(65) Prior Publication Data

US 2009/0210498 A1    Aug. 20, 2009

(51) Int. Cl.
*G06F 15/16* (2006.01)

(52) U.S. Cl. ......... 709/246; 709/206; 709/207; 709/247

(58) Field of Classification Search .................. 709/206, 709/203, 219
See application file for complete search history.

(56) References Cited

U.S. PATENT DOCUMENTS

| | | | |
|---|---|---|---|
| 6,589,291 B1 * | 7/2003 | Boag et al. | 715/235 |
| 2002/0122054 A1 * | 9/2002 | Hind et al. | 345/731 |
| 2004/0015954 A1 | 1/2004 | Tuerke | |
| 2005/0160065 A1 * | 7/2005 | Seeman | 707/1 |
| 2005/0251742 A1 * | 11/2005 | Mogilevsky et al. | 715/521 |
| 2005/0257142 A1 * | 11/2005 | Lai et al. | 715/523 |
| 2006/0020693 A1 * | 1/2006 | Hellstrom | 709/223 |
| 2007/0288514 A1 * | 12/2007 | Reitter et al. | 707/104.1 |
| 2008/0141116 A1 * | 6/2008 | Mohan | 715/236 |
| 2008/0168345 A1 * | 7/2008 | Becker | 715/242 |

* cited by examiner

*Primary Examiner* — Jude J Jean-Gilles
*Assistant Examiner* — Jaren M Means
(74) *Attorney, Agent, or Firm* — Ridout & Maybee LLP

(57) ABSTRACT

A method, server and system for optimizing and delivering HyperText Markup Language (HTML)-based content such as HTML-based email messages to mobile communication devices is provided. In accordance with one embodiment, the method comprises: receiving an email message comprising an HTML portion comprising an HTML header and an HTML body; determining if the HTML header includes a reference to a Cascading Style Sheet (CSS) document comprising one or more rules; if the HTML header includes a reference to a CSS document, replacing the reference with the CSS rules of the CSS document, and sending the transformed email message to a destination mobile communication device.

18 Claims, 4 Drawing Sheets

METHOD, SERVER AND SYSTEM FOR OPTIMIZING HTML-BASED CONTENT

TECHNICAL FIELD

The present disclosure relates generally to communication systems and, more particularly to a method, server and system for optimizing HTML-based content such as HTML-based email messages.

BACKGROUND

Due at least in part to data charges associated with receiving data on mobile or wireless communication devices such as handheld communication devices, data which is automatically pushed out to devices without any user input is often limited in size. This aids in limiting the data charges associated with the pushed data in the absence of user input to the contrary. For example, email messages and web page loads pushed to a device may only be a portion of the full message or web page. A user may have to request extra data (e.g., more of the message or web page) for more data to be transmitted. It is possible that the additional data transmitted to the device may still not complete the full message or page load, requiring yet a further request or requests. Message and page loads may also be handled in this manner due to technical constraints or limited resources of mobile communication devices.

Certain types of messages and other content contain additional information describing how to format or render for display or other use such content in ways that cannot be easily or efficiently represented using plain text. Examples include messages and other content in "rich text" format, HTML format, and the like. These types of messages require more data and more space as a result of the style, formatting and other "rich features" of such messages. In order to keep data charges lower or to accommodate the resource/processing constraints of mobile communication devices, these messages and other content may benefit even more than plain text from an optimization of content in order to limit the amount of data occupied by the message pushed to mobile communication devices or to reduce the demands on the resources of such devices.

Thus, there exists a need for methods, servers and systems for optimizing HTML-based content such as HTML-based email messages.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
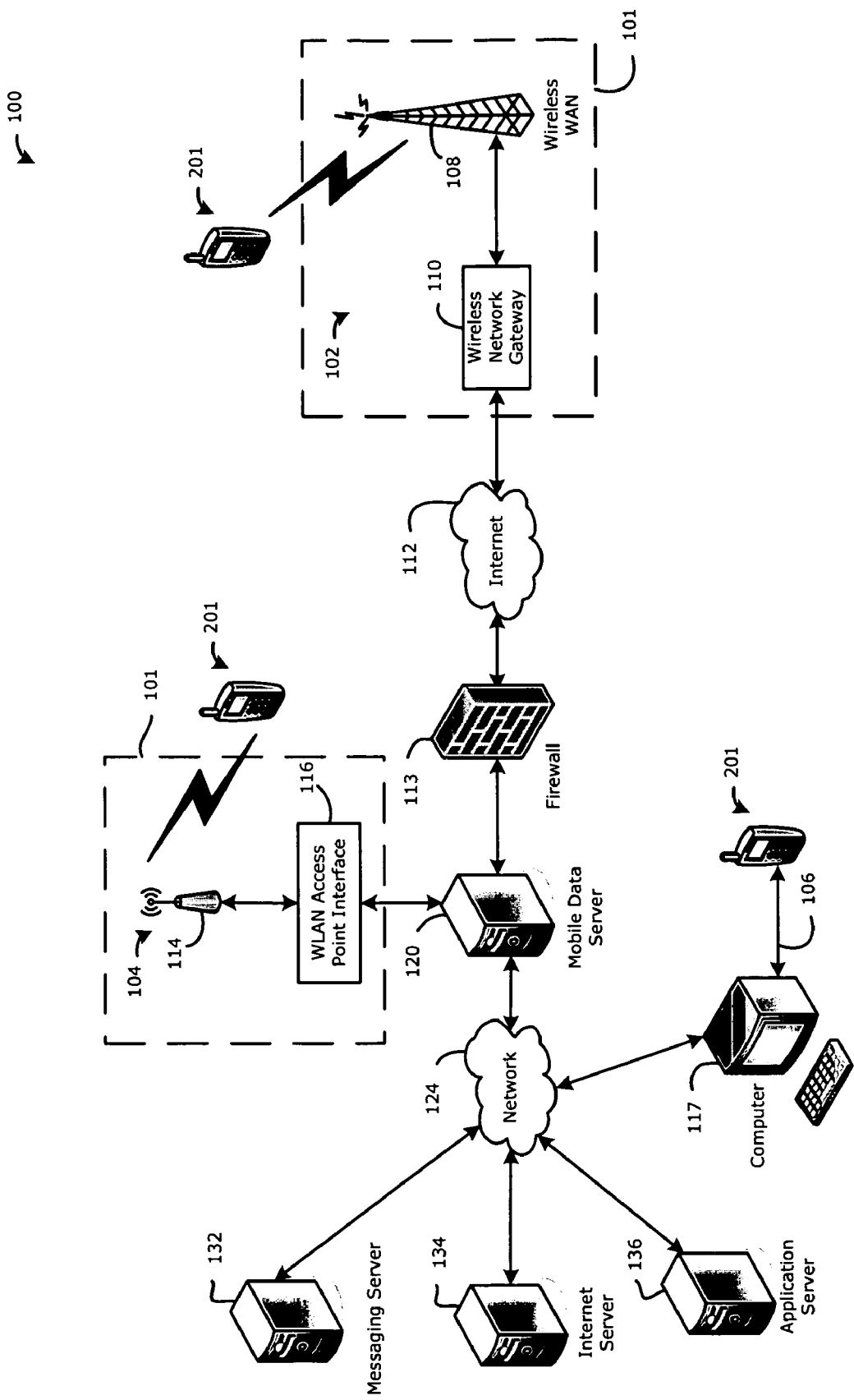
FIG. 1 is a block diagram illustrating a communication system including a mobile communication device to which example embodiments of the present disclosure can be applied.

Reference is first made to FIG. 1 which shows in block diagram form a communication system 100 in which example embodiments of the present disclosure can be applied. The communication system 100 comprises a number of mobile communication devices 201 (described in greater detail in FIG. 2) which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 comprises a wireless network gateway 110 which connects the mobile communication devices 201 to the Internet 112, and through the Internet 112 to a wireless connector system comprising a mobile data server 120. The mobile data server 120 may be operated by an enterprise such as a corporation which allows access to a network 124 such as an internal or enterprise network and its resources, or the mobile data server 120 may be operated by a mobile network provider. If the mobile data server 120 is operated by a mobile network service provider, the network 124 may be the Internet 112 rather than an internal or enterprise network.

The wireless network gateway 110 provides translation and routing services between the mobile data server 120 and the WWAN 102, which facilitates communication between the mobile communication devices 201 and other devices (not shown) connected, directly or indirectly, to the wireless network 101. Accordingly, communications sent via the mobile communication devices 201 are transported via the wireless network 101 to the wireless network gateway 110. The wireless gateway 110 forwards the communications to the mobile data server 120 via the Internet 112. Communications sent from the mobile data server 120 are received by the wireless network gateway 110 and transported via the wireless network 101 to the mobile communication devices 201.

The WWAN 102 may be implemented as a packet-based cellular network that includes a number of transceiver base stations 108 (one of which is shown in The WWAN 102 may be implemented using any suitable network technology. By way of example, by not limitation, the WWAN 102 may be implemented as a packet-based wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which connects to the mobile data server 120 directly (for example, if the access point 114 is part of an enterprise WLAN 104 in which the mobile data server 120 resides), or indirectly via the Internet 112 if the access point 14 is a personal Wi-Fi network or Wi-Fi hotspot (in which case a mechanism for securely connecting to the mobile data server 120, such as a virtual private network (VPN), may be required). The AP interface 116 provides translation and routing services between the access points 114 and the mobile data server 120 to facilitate communication, directly or indirectly, with the mobile data server 120.

It will be appreciated that the WWAN 102 and WLAN 104 may have coverage areas that overlap, at least partially. Typically, the coverage area of the WWAN 102 will be much larger than the coverage area of the WLAN 104 and may overlap all or a large percentage of the coverage area of the WLAN 104. The WLAN 104 may have sole coverage in some regions that are dead spots in the WWAN 102. For example, some interior locations of an enterprise's buildings may be impenetrable to signals transmitted by the WWAN 102. Typically, the channel resources, such as bandwidth available for providing content to the mobile communication devices 201 will be greater over the WLAN 104 than over the WWAN 102.

The mobile data server 120 may be implemented as one or more server modules, and is typically located behind a firewall 113. The mobile data server 120 manages communications to and from a set of managed mobile communication devices 201 such that the mobile communication devices 201 are each enabled to exchange electronic messages and other information with each other and computers, for example via the Internet 112. The mobile data server 120 also provides administrative control and management capabilities over users and mobile communication devices 201 which may connect to the mobile data server 120.

The mobile data server 120 allows the mobile communication devices 201 to access the network 124 and connected resources and services such as a messaging server 132 (for example, a Microsoft Exchange™, IBM Lotus Domino™, or Novell GroupWise™ email server) for implementing or connecting to a messaging system, an Internet server 134 for connecting to the Internet 112 and World Wide Web (WWW), and application servers 136 for implementing server-based applications such as instant messaging (IM) applications or for accessing other servers such as content servers. The Internet server 134 and/or application servers 136 may, in some operational modes, function as proxy servers for obtaining content from remote content sources such as content servers (sometimes referred to as origin servers).

The mobile data server 120 typically provides a secure exchange of data (e.g., email messages, personal information manager (PIM) data, and IM data) with the mobile communication devices 201. In some embodiments, communications between the mobile data server 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the mobile data server 120 using the private encryption key retrieved from the user's mailbox. The encrypted data, when received on the mobile communication devices 201, is decrypted using the private encryption key stored in memory. Similarly, data sent to the mobile data server 120 from the mobile communication devices 201 is encrypted using the private encryption key stored in the memory of the mobile communication device 201. The encrypted data, when received on the mobile data server 120, is decrypted using the private encryption key retrieved from the user's mailbox.

The mobile data server 120 may also comprise an Internet connectivity module (not shown) which provides TCP/IP (transmission control protocol/Internet protocol) and HTTP (hypertext transfer protocol)-based connectivity providing an Internet based service connection. The Internet connectivity module provides the mobile communication devices 102 with access to the Internet 112 and World Wide Web (WWW) and possibly other external communication networks connected directly or indirectly to the mobile data server 120. Alternatively, in other embodiments, the Internet connectivity module may be implemented by a separate server or server application which is connected to the mobile data server 120.

The wireless network gateway 110 is adapted to send data packets received from the mobile communication device 201 over the WWAN 102 to the mobile data server 120. The mobile data server 120 then sends the data packets to the appropriate connection point such as the messaging server 132, Internet server 134, or application servers 136 where the data packets can be sent to the appropriate end point. Conversely, the mobile data server 120 sends data packets received, for example, from the messaging server 132, Internet server 134, or application server 136 to the wireless network gateway 110 which then transmit the data packets to the destination mobile communication device 201. The AP interfaces 116 of the WLAN 104 provide similar sending functions between the mobile communication device 201, the mobile data server 120 and network connection point such as the messaging server 132, Internet server 134, and application server 136.

The network 124 may comprise a private local area network, metropolitan area network, wide area network or combinations thereof and may include virtual networks constructed using any of these, alone, or in combination. A user may connect to the mobile data server 120 using a computer 117, such as desktop or notebook computer, via the network 124. If the mobile data server 120 is operated by a mobile network provider rather than an enterprise, the network 124 may be the Internet 112. If the mobile data server 120 is operated by an enterprise, there may be a number of enterprise computers 117 connected to the network 124.

A link 106 may be provided for exchanging information between the mobile communication device 201 and a computer 117 connected to the mobile data server 120. The link 106 may comprise one or both of a physical interface and short-range wireless communication interface 106. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface is a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as Bluetooth® or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

Figure 2:
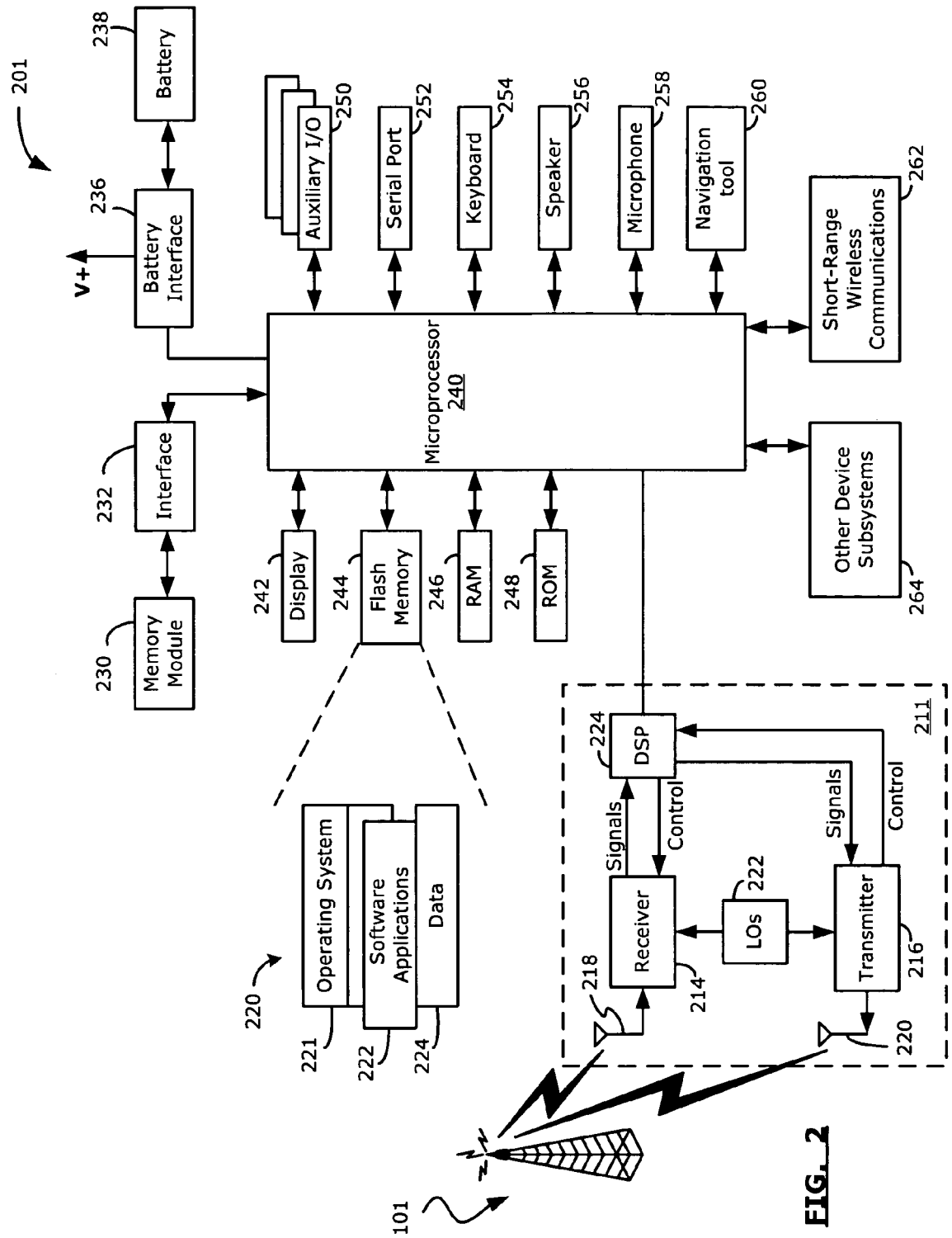
FIG. 2 is a block diagram illustrating a mobile communication device in which example embodiments of the present disclosure can be applied.

Reference is now made to FIG. 2 which illustrates in block diagram form a mobile communication device 201 in which example embodiments described in the present disclosure can be applied. The mobile communication device 201 is a two-way communication device having at least data and possibly also voice communication capabilities, and the capability to communicate with other computer systems, for example, via the Internet 112. Depending on the functionality provided by the mobile communication device 201, in various embodiments the device may be a data communication device, a multiple-mode communication device configured for both data and voice communication, a mobile telephone, a PDA (personal digital assistant) enabled for wireless communication or smartphone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, handheld electronic device is small enough to fit inside a standard purse or coat pocket or belt mounted holster.

The mobile communication device 201 includes a wireless communication subsystem 211 for exchanging radio frequency signals with the wireless network 101. The wireless communication subsystem 211 comprises at least one of a WAN communication subsystem for two-way communication with the WWAN 102 and a WLAN communication subsystem two-way communication with the WLAN 104 via the access points 116. The wireless communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the wireless communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The mobile communication device 201 includes a microprocessor 240 which controls the overall operation of the mobile communication device 201. The microprocessor 240 interacts with communication subsystem 211 which performs communication functions. The microprocessor 240 also interacts with additional device subsystems which may include but are not limited to a display device 242 which may be a liquid crystal display (LCD) screen, a flash memory 244, a random access memory (RAM) 246, a read only memory (ROM) 248, auxiliary input/output (I/O) subsystems 250, a data port 252 such as serial data port (for example, a Universal Serial Bus (USB) data port), a keyboard or keypad 254, a speaker 256, microphone 258, a navigation tool 260 such as a clickable scroll wheel (also referred to as a track wheel or thumbwheel) or trackball, a short-range communication subsystem 262, and other device subsystems generally designated as 264. Different numbers and combinations of the aforementioned device subsystems may be present in various embodiments, and not all need be present in some embodiments. The keypad 254 maybe either a complete alphanumeric keypad, a limited, reduced, or simplified alphanumeric keypad, or a telephone-type keypad. In some embodiments, the mobile communication device 201 may comprise a touch-screen display which, in at least some embodiments, includes a touch-sensitive input surface which overlays the display device 242. In such embodiments, the keypad 254 may be omitted, and possibly the navigation tool 260 may be realized using the touch-sensitive input surface.

The microprocessor 240 operates under stored program control and executes software modules 220 stored in memory such as persistent memory, for example, in the flash memory 244. The software modules 220 comprise operating system software 221 and software applications 222. Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications 222 may include a range of applications, including, for example, an address book application, a messaging application, a calendar application, and/or a notepad application. In some embodiments, the software applications 222 includes one or more of a Web browser application (i.e., for a Web-enabled mobile communication device), an email message application, a push content viewing application, a voice communication (i.e. telephony) application, a map application, and a media player application. Each of the software applications 222 may include layout information defining the placement of particular fields and graphic elements (e.g. text fields, input fields, icons, etc.) in the user interface (i.e. the display device 242) according to the application.

In some embodiments, the auxiliary input/output (I/O) subsystems 250 may comprise an external communication link or interface, for example, a Global Positioning System (GPS) communication subsystem for communicating with a satellite network (not shown) for navigation or other functionality, an Ethernet interface, or wireless communication interfaces for communicating with other types of wireless networks such as, for example, an orthogonal frequency division multiplexed (OFDM) network.

In some embodiments, the mobile communication device 201 also includes a removable memory card 230 (typically comprising flash memory) and a memory card interface 232. Network access to the WWAN 102, and possibly the WLAN 104, is typically associated with a subscriber or user of the mobile communication device 201 via the memory card 230, which may be a Subscriber Identity Module (SIM) card or other type of memory card for use in the relevant wireless network type. The memory card 130 is inserted in or connected to the memory card interface 232 of the mobile communication device 201 in order to operate in conjunction with the wireless network 101.

The mobile communication device 201 stores data 224 in an erasable persistent memory, which in one example embodiment is the flash memory 244. In various embodiments, the data 224 includes service data comprising information required by the mobile communication device 201 to establish and maintain communication with the wireless network 101 (for example, network service data and gateway service data). The data 224 may also include user application data such as email messages, address book and contact information, calendar and schedule information, notepad documents, image files, and other commonly stored user information stored on the mobile communication device 201 by its user, and other data. The data 224 may also include data required for the communication layers managed by the mobile data server 120 and servers 132, 134, 136. The data 224 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used in handheld communication devices such as smartphones for synchronization with the user's computer 117 and may be used to implement link 106 (FIG. 1) The serial data port 252 may allow a user to set preferences on the device 201 using the computer 117 and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (such as USB) or PAN connection (such as Bluetooth®) to the computer 117 using standard connectivity protocols. When a user connects their mobile communication device 201 to the host computer 117 via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer 117 for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.) or a communication module for IEEE 802.15.3a (UWB).

A predetermined set of applications that control basic device operations, including data and possibly voice communication applications will normally be installed on the mobile communication device 201 during or after manufacture. Additional applications and/or upgrades to the operating system 221 or software applications 222 may also be loaded onto the mobile communication device 201 through the wireless network 101, the auxiliary I/O subsystem 250, the serial port 252, the short-range communication subsystem 262, or other suitable subsystems 264 which may include other wireless communication interfaces. The downloaded programs or code modules may be permanently installed, for example, written into the program memory (i.e. the flash memory 244), or written into and executed from the RAM 246 for execution by the microprocessor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 101. In some example embodiments, PIM data items are seamlessly combined, synchronized, and updated via the wireless network 101, with the user's corresponding data items stored and/or associated with the user's computer 117, thereby creating a mirrored host computer on the mobile communication device 201 with respect to these data items.

The mobile communication device 201 may provide two principal modes of communication: a data communication mode and an optional voice communication mode. In the data communication mode, a received data signal such as a text message, an email message, or Web page download will be processed by the communication subsystem 211 and input to the microprocessor 240 for further processing. For example, a downloaded Web page may be further processed by a browser application or an email message may be processed by an email message application and output to the display 242. A user of the mobile communication device 201 may also compose data items, such as email messages, for example, using the keypad 254 and/or the navigation tool 260 in conjunction with the display 242 and possibly the auxiliary I/O device 250. The composed items may be transmitted through the wireless communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and the keyboard or keypad 254). Alternative voice or audio I/O subsystems, such as a voice message recording subsystem, may also be implemented on the mobile communication device 201. Although voice or audio signal output is typically accomplished primarily through the speaker 256, the display 242 may also be used to provide an indication of the identity of a calling party, duration of a voice call, or other voice call related information.

Figure 3:
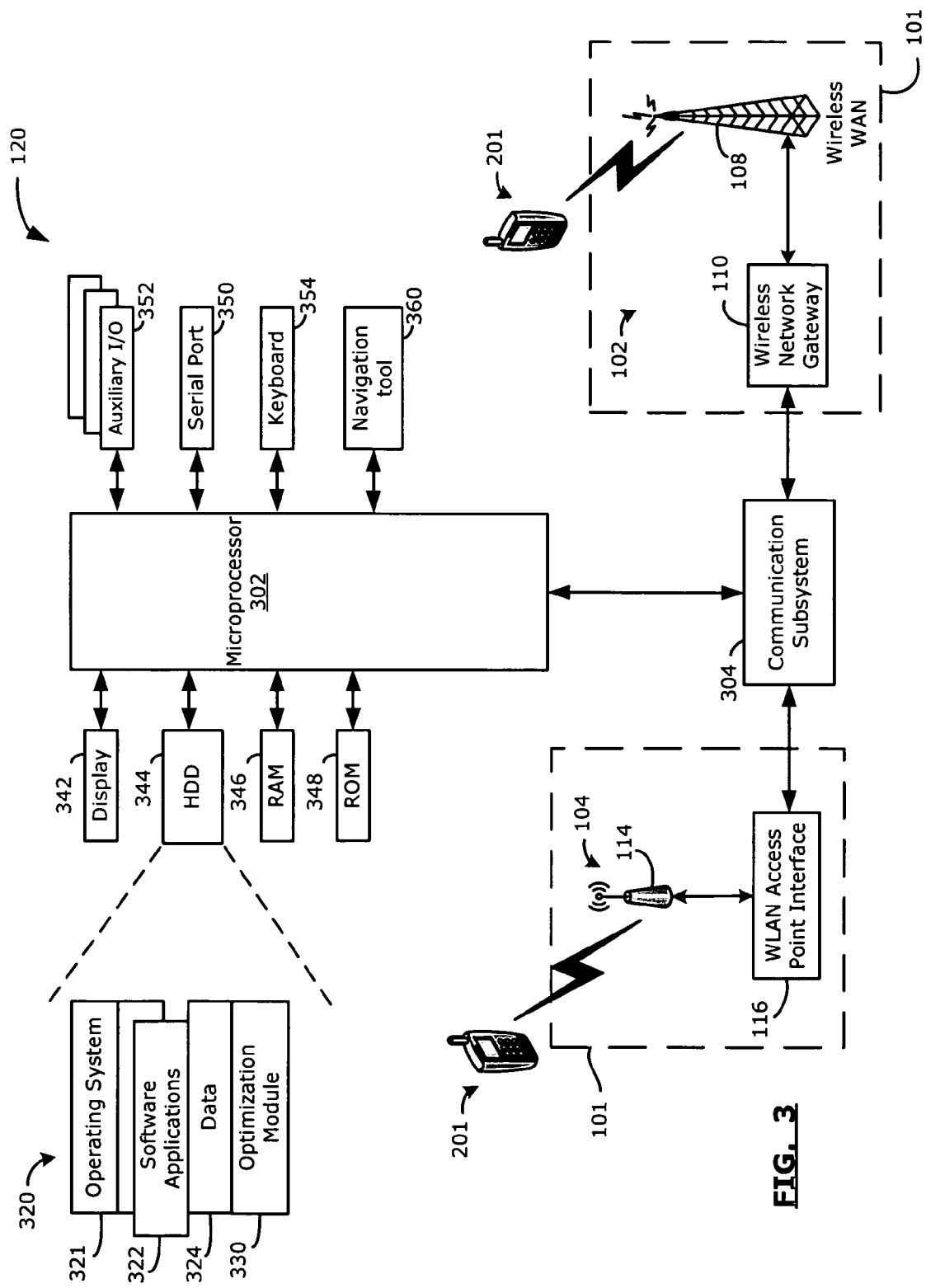
FIG. 3 is a block diagram illustrating a mobile data server in accordance with one embodiment of the present disclosure.

Referring now to FIG. 3, a mobile data server 120 for use in accordance with one embodiment of the present disclosure will now be described in more detail. The mobile data server 120 is a computer implementing one or more server applications configured for performing the processes and functions described herein. The mobile data server 120 comprises a controller comprising at least one microprocessor 302 for controlling its overall operation and a communication subsystem 304. The communication subsystem 304 performs communication functions for directly or indirectly communicating with various connection points of the communication system 100, such as the network 124 and servers 132, 134, 136, the AP interfaces 116 of the WLAN 104, the wireless network gateway 110 of the WWAN 102, and the mobile communication devices 201. The communication subsystem 304 comprises at least a WWAN communication subsystem (not shown) for two-way communication with the WWAN 102 and possibly a WLAN communication subsystem (not shown) for two-way communication with the WLAN 104 via the access points 116.

The mobile data server 120 may further comprise a display screen 342 or monitor connected to the microprocessor 302, one or more user input devices such as a keyboard 354 and navigation tool 360 (such as a mouse) connected to the microprocessor 302 for sending user input signals to the microprocessor 302 in response to user inputs, one or more memories or electronic storage elements connected to the microprocessor 302 such as a hard disk drive (HDD) 344 or other nonvolatile memory such as flash memory, a random access memory (RAM) 346, a read only memory (ROM) 348, a data port 350 such as serial data port (for example, a Universal Serial Bus (USB) data port), and auxiliary input/output (I/O) devices 352. Other features of the mobile data server 120 for implementing the processes and functions described herein will be appreciated by persons ordinarily skilled in the art.

The microprocessor 302 operates under stored program control and executes software modules 320 stored in memory such as persistent memory, for example, in the HDD 344. The software modules 320 comprise data and instructions which may comprise operating system software 321 and software applications 322. Data 324 necessary for performing the various functions of the mobile data server 120 are also stored on the HDD 344. Those skilled in the art will appreciate that the software modules 320 or parts thereof may be temporarily loaded into volatile memory such as the RAM 346. The RAM 346 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The mobile data server 120 also includes an optimization module 330 which configures the microprocessor 302 to carry out the optimization processes described herein. The optimization module 330 includes instructions for execution by microprocessor 302 for receiving HyperText Markup Language (HTML) formatted email messages, optimizing the email messages for delivery to one or more of the mobile communication devices 201, and transmitting (sending) the optimized messages to the destination mobile communication devices. The optimization module 330 may, among other things, be a stand-alone software application 322, part of the operating system 321, or part of another software application 322. In some embodiments, the functions performed by optimization module 330 may be realized as a plurality of independent elements, rather than a single integrated element, and any one or more of these elements may be implemented as parts of other software modules. Furthermore, in some embodiments, at least some of the functions performed by the optimization module 330 may be implemented in firmware of the mobile data server 120. Finally, although the optimization module 330 is described, in connection with one embodiment, as a part of the mobile data server 120, it could in other embodiments be realized, either as an independent server or as part of a multiple-function server, other than mobile data server 120, but operatively coupled or connected thereto. Thus, as henceforth further referenced and claimed herein, unless otherwise specified, optimization module 330 shall denote both the program instructions (whether software or firmware) and those portions of any hardware elements necessary to execute such instructions at any particular time, and shall be considered to be operatively coupled to the controller part of mobile data server 120 whether those instructions are executed on mobile data server 120 or on some other server.

The current HTML specification is 401; however the present disclosure is not limited to any particular version and is intended to cover all prior and future versions, revisions, supplements, additions and replacements to the HTML specification to the extent they are compatible with the teachings of the present disclosure.

Figure 4:
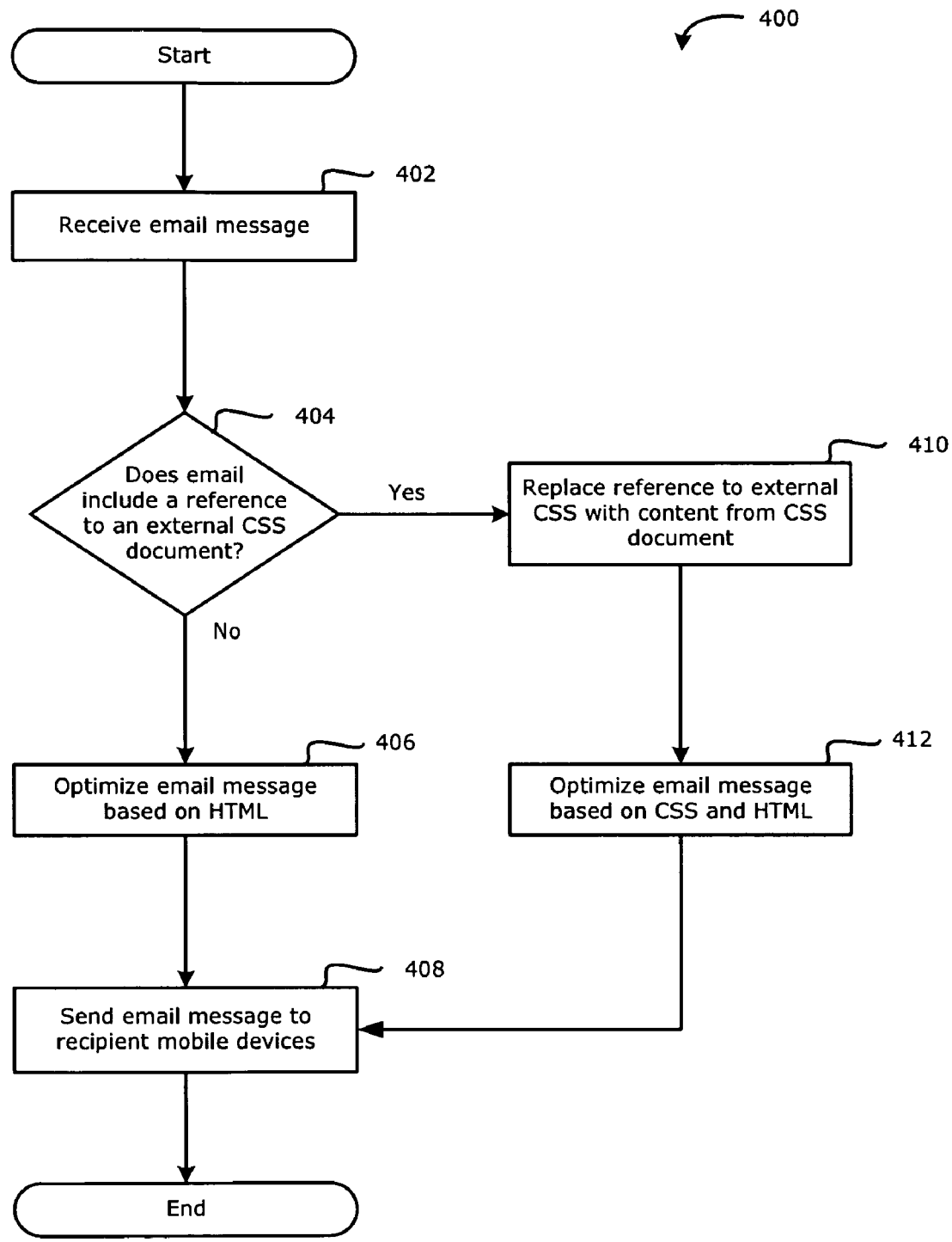
FIG. 4 is a flowchart illustrating a process for optimizing an HTML-based email message in accordance with one embodiment of the present disclosure.

Reference is now made to FIG. 4 which illustrates operations 400 for optimizing an HTML-based email message for delivery to a mobile communication device 201 in accordance with one embodiment of the present disclosure. The operations 400 are performed by the optimization module 330 of the mobile data server 120. In other embodiments, the operations 400 may be performed by a separate server connected to the mobile data server 120.

In a first step 402, an HTML email message intended for one or more mobile communication device 201 is received by the mobile data server 120. As will be appreciated by persons skilled in the art, an email message comprises a header which includes a number of header fields and a message body. An HTML email message contains HTML content within the body of the message. The HTML content is located within an HTML portion of the message body, and comprises an HTML header and HTML body. The HTML header is denoted using the tags <head> and </head> to mark the start and end of the HTML header, respectively. The HTML body is denoted using the tags <body> and </body> to mark the start and end of the HTML body, respectively. The email message is typically received from a messaging server 132, such as Microsoft Exchange™, which receives the email message from an email client, which may be a Personal Information Management (PIM) application such as Microsoft Outlook™. The email message may be sent from any computer or mobile communication device 201 connected to the Internet 112 or to the network 124.

The operations 400 may comprise, as a preliminary step, the step of parsing or analyzing all email messages received by the mobile data server 120 to determine if the message is a plain text (unformatted) email message, or an HTML formatted email message, and processing only those email messages received by the mobile data server 120 which are formatted using HTML. This determination may be made, for example, for Multipurpose Internet Mail Extensions (MIME) complaint email messages by parsing the email message and analyzing it for an indication of whether the message contains HTML content, for example, that the message contains a content-type header with a value of text/html or other indication of HTML content. As will be understood by persons skilled in the art, the MIME specification defines a series headers for specifying attributes of an email message including the "content-type" header field (which specifies a type and subtype of the message content) and defines a set of transfer encodings, amongst many parameters for formatting email. The MIME specification is currently specified in six (6) Request for Comment (RFC) documents: RFC 2045, RFC 2046, RFC 2047, RFC 4288, RFC 4289 and RFC 2077; however the present disclosure is not limited to any particular version and is intended to cover all prior and future versions, revisions, supplements, additions and replacements to the MIME specification to the extent they are compatible with the teachings of the present disclosure, and to cover other email formats and specifications which may be formatted in accordance with HTML (for example, proprietary email message formats).

Next, in step 404 the mobile data server 120 parses (analyzes) the HTML header of the email message to determine if the email message includes a reference to an external Cascading Style Sheets (CSS) document. The HTML header is the standard location of CSS references in HTML. However, the mobile data server 120 may parse one or more of the other parts of the email message to determine if CSS references are located outside the HTML header, elsewhere in the email message. Any CSS references that appear elsewhere in the message in a non-standard location are moved to the HTML header and treated as if they were originally found in the HTML header. The "external" CSS document may be attached to the email message or located remotely, for example, on a content server 136. The reference to the attached or remotely located CSS document may comprise an absolute or relative URI (Uniform Resource Identifier). URIs are described in RFC 3986. As will be appreciated by persons skilled in the art, CSS is a stylesheet language used to style documents (e.g., to describe the presentation of documents) written in a markup language such as HTML. The current specification for CSS is level 2, revision 1 (CSS 2.1); however the present disclosure is not limited to any particular version and is intended to cover all prior and future versions, revisions, supplements, additions and replacements to the CSS specification to the extent they are compatible with the teachings of the present disclosure.

As will be appreciated by persons skilled in the art, each CSS document, referred to as a style sheet, comprises one or more style rules (also referred to as CSS rules) which define a style. Each rule consists of one or more selectors and a declaration block. A declaration block consists of a list of semicolon separated declarations which begins with a left curly brace ({) and ends with a right curly brace (}). Each declaration itself consists of a property, a colon (:), a value, then a semi-colon (;).

CSS documents allow users to apply style (e.g., fonts, colors and spacing) to structured documents (i.e., documents in a structured definition language) such as HTML formatted email messages and other HTML documents. CSS content is typically applied using CSS documents or files which are separate from ("external to") the structured documents which they are applied to. In the context of websites, the separation of the style (or presentation) of documents from the content of documents simplifies web page authoring and web site maintenance. However, in the messaging context, the separation of document content and style information which results from using CSS documents poses challenges for message delivery and integration, particularly in relation to mobile delivery.

As noted above, a CSS document may be attached to the email message or located remotely. The reference to the attached or remotely located CSS document may comprise a URI which may be a Uniform Resource Locator (URL), Uniform Resource Name (URN), or both. Where the CSS document is attached to the email message, the URI may be a relative "Content-ID" URI (described by RFC 2392) which references an attachment to the email message. Where the CSS document is located remotely, for example on a content server 136, the URI points to the location where the CSS document may be retrieved by the mobile data server 120.

If the email message does not include a reference to an external CSS document (step 404), then execution proceeds to step 406 where, optionally, further processing and/or optimization of the email message may occur (for example, optimization of the HTML of the email message). After the optional further processing/optimization, execution proceeds to step 408 where the email message is sent or transmitted by the mobile data server 120 to the mobile communication devices 201 indicated by the address fields (e.g., "To", "CC" and "BCC" fields) of the email message. Next, execution ends. It will be appreciated by persons skilled in the art that the mobile data server 120 may not perform all of the transmitting functions required to deliver the email message to the mobile communication devices 201, and that the mobile data server 120 may send the transformed email message for delivery to the respective WWAN 102 or WLAN 104 communication subsystem of the wireless network 101, which in turn transmits the email message to the destination mobile communication devices 201. For example, the mobile data server 120 may send the email message to the wireless network gateway 110 of the WWAN 102 or the AP interface 116 of the WLAN 104, from which the email message is transmitted to destination mobile communication devices 201 using the communication infrastructure of the WWAN 102 or WLAN 104.

If the email message includes a reference to an external CSS document, execution proceeds to step 410 where the external reference is replaced with CSS content from the CSS document attached to the email message or located remotely. If the external reference is to a remotely located CSS document, the CSS document is first retrieved (downloaded) by the mobile data server 120. If more than one reference to an external CSS document is present in the HTML header, each reference is replaced with CSS content from the respective CSS document.

The retrieval and replacement of remotely located CSS documents may be contingent on an option specified by the mobile device user or mobile data server administrator, since retrieval of external documents may expose information to the remote server. Examples of information which may be exposed includes, but is not limited to, the existence and validity of the email address of the mobile device user, the IP address and location of the mobile device user, the name and version of the email messaging or PIM manager application on the mobile communication device 201, and that the associated email message has been read by the mobile device user. Such restrictions can, but typically do not, apply to CSS attachments.

The content of the CSS document is placed within a "STYLE" block in the HTML header. If the HTML document is non-standard and contains CSS content in the HTML body, it is moved to the header. For each external reference, a new STYLE block is inserted; however it is possible and valid for the external CSS content to be placed in an existing STYLE block. In both cases, the order that the CSS rules appear is preserved. The inserted STYLE block is processed in the same manner as if it were originally part of the email message. STYLE blocks are denoted by tags in the HTML portion of the email message using the tags <style> and </style> to mark the start and end of the STYLE block, respectively. The HTML body refers to STYLE blocks for style (presentation) information used in formatting the content of the message using HTML compatible email clients (application) or PIM clients (application).

Next, in step 412 CSS related optimizations and optionally HTML optimizations may be applied to the email message. In some embodiments, CSS optimizations may comprise one or any combination of: removing any unreferenced (e.g., unused and unnecessary) CSS rules; removing any duplicate (redundant) CSS rules; and interleaving at least some of the style entries (e.g., CSS rules) into the body of the email message. HTML optimizations may also be applied to the email message.

Next, after the CSS related optimizations and optional HTML optimizations, execution proceeds to step 408 where the optimized email message is transmitted by the mobile data server 120 to the mobile communication devices 201 indicated by the address fields (e.g., "To", "CC" and "BCC" fields) of the email message. Next, execution ends. As noted above, it will be appreciated by persons skilled in the art that the mobile data server 120 may not perform all of the transmitting functions required to deliver the email message to the mobile communication devices 201, and that the mobile data server 120 may send the transformed email message for delivery to the respective WWAN 102 or WLAN 104 communication subsystem of the wireless network 101, which in turn transmits the email message to the destination mobile communication devices 201.

For the purpose of illustration, reference will now be made to example code of an HTML formatted email message. The example code is presented for the purpose of illustrating the methods of the present disclosure only, and is not intended to be limiting. Example HTML code of an email message with an attached CSS document is as follows (message header fields, such as MIME message headers, have been omitted):

```
<html>
<head>
<title>Hello world</title>
<link rel="stylesheet" type="text/css" href="cid:attachment.css">
<style>
.c4 { color: purple }
.c5 { color: yellow }
</style>
</head>
<body>
<p class="c1">This sentence should be red.</p>
<p class="c2">This sentence should be green.</p>
<p class="c3">This sentence should be blue.</p>
<p class="c4">This sentence should be purple.</p>
<p class="c5">This sentence should be yellow.</p>
</body>
</html>
```

In the example code set forth above, href="cid:attachment.css" refers to a CSS document (file) "attachment.css" attached to the email message. The contents of the CSS file "attachment.css" may be as follows:

```
.c1 { color: red }
.c2 { color: green }
.c3 { color: blue }
```

In accordance with the method of the present disclosure, the mobile data server 120 analyses and detects the CSS file as an attachment to the email message, reads the contents of the CSS file, and transforms the HTML in the email message by inserting the contents of the CSS file directly into the HTML. The transformed HTML of an email message based on the example code above would appear as follows:

```
<html>
<head>
<title>Hello world</title>
<style>
.c1 { color: red }
.c2 { color: green }
.c3 { color: blue }
</style>
<style>
.c4 { color: purple }
.c5 { color: yellow }
</style>
</head>
<body>
```

```
<p class="c1">This sentence should be red.</p>
<p class="c2">This sentence should be green.</p>
<p class="c3">This sentence should be blue.</p>
<p class="c4">This sentence should be purple.</p>
<p class="c5">This sentence should be yellow.</p>
</body>
</html>
```

After the HTML has been transformed to include the CSS content of the CSS document, CSS optimizations and/or HTML optimizations may be performed on the transformed email message. The CSS optimizations may include, but are not limited to, one or any combination of: removing any unreferenced CSS rules; removing any duplicate (redundant) CSS rules; and interleaving at least some of the style entries (e.g., CSS rules) into the body of the email message. Interleaving comprises sorting of the CSS rules into the order that they are referenced in the HTML body, determining groups of CSS rules from the sorted CSS rules in accordance with predetermined parameters or rules, and moving the groups of CSS rules in groups into respective STYLE blocks in the HTML body that precede the references to the respective CSS rules. Typically, a new STYLE block is inserted for each group, but the CSS rules may be placed in an existing STYLE block in the HTML body which precedes the reference to the CSS rule. CSS rules which were added to interleaved STYLE blocks in the HTML body are removed from the HTML header.

Based on the example code above, the transformed email message may be optimized by combining the STYLE block added by the transformation step with the pre-existing STYLE block in the original email message. The optimized HTML of the email message would appear as follows:

```
<html>
<head>
<title>Hello world</title>
<style>
.c1 { color: red }
.c2 { color: green }
.c3 { color: blue }
.c4 { color: purple }
.c5 { color: yellow }
</style>
</head>
<body>
<p class="c1">This sentence should be red.</p>
<p class="c2">This sentence should be green.</p>
<p class="c3">This sentence should be blue.</p>
<p class="c4">This sentence should be purple.</p>
<p class="c5">This sentence should be yellow.</p>
</body>
</html>
```

If duplicate CSS rules are present after embedding the CSS content from the CSS document, the duplicate entries may be removed. Duplicate entries may occur, for example, because the CSS document includes a CSS rule which corresponds to a style rule which is specified again later in the message, for example, in a pre-existing STYLE block or in a STYLE block created for an external reference. For example, if the CSS document specified the color purple (".c4 { color: purple}" in the example code above), this would create a duplicate entry as an equivalent entry was present in STYLE block of the original email message. Duplicate entries may also occur because multiple CSS documents are referenced by the email message, and that at least some of the CSS documents included at least some CSS rules in common. If multiple CSS documents are referenced by the email message, these documents may be attached to the message, located remotely, or combinations of both.

An unreferenced CSS rule may occur if, for example, the CSS content in the CSS document includes CSS rules which are not referenced in the HTML body of the email message. For example, if a CSS rule for the color black where also included in the CSS document (e.g., ".c6 {color: black}" in the example code above), this entry would be unreferenced since the HTML body of the email message does not refer to the class "c6". Thus, the CSS optimizations may comprise removing this CSS rule from the transformed email message because it is unreferenced and, therefore, unused.

Furthermore, it should be appreciated that the mobile data server 120 may data delivery options or settings which enforce a size limit on each HTML email message retrieved from the messaging server 132. CSS rules that are only referenced in HTML beyond the size limit are treated as unreferenced rules and removed. Accordingly, in some embodiments the mobile data server 120 determines the size of the email message to be sent to the destination mobile communication device 201, determines if the email message is to be sent in portions in accordance with a predetermined message size threshold (e.g. 2 kB), and determines the portions (i.e., selects the portions) of the email message to be sent to the destination mobile communication device in the transformed message if the size of the email message is greater than or equal to the predetermined message size threshold (e.g. 2 kB). It will be appreciated that, if the message is to be sent in portions, multiple transformed email messages will need to be send to delivery the entire, original email message. However, the user must typically request the additional portions to receive them. The predetermined message size threshold, determining if the message is to be sent in portions, and message portion selection is typically based on the original email message, however it could be based on the transformed email message. As noted elsewhere in the present disclosure, CSS interleaving may comprise selecting groups of CSS rules based on references to the CSS rules in the portions of the message to be delivered to the mobile communication device 201, and moving these groups of CSS rules into the HTML body of the email message.

As will be appreciated by persons skilled in the art, the method described herein embeds CSS content into HTML formatted email messages. This reduces inefficiencies relating to using attached and remotely located CSS documents by eliminating the need for mobile communication devices, with limited resources, to open CSS documents, and parse and process the contents of these documents when opening and viewing the message. The described methods also allow CSS optimizations to be performed on the email message. These optimizations (sometimes referred to as joint CSS and HTML optimizations) may comprise removing unreferenced CSS rules (e.g., unnecessary and unused CSS rules), removing redundant (e.g., duplicate) CSS rules, and/or interleaving CSS rules within the HTML body. Depending on the mobile data delivery options, there may be limits on the number of attachments which are initially delivered to the mobile communication devices, with the remainder or further portion of the attachments being sent only if the user requests it. Embedding or incorporating CSS content into the message reduces or avoids processing errors and presentation inefficiencies which may be caused by the message referencing attached or remotely located CSS documents which have not been delivered to the mobile communication device. Moreover, depending on the mobile data delivery options, if attachments are not automatically delivered with the message, the incorporating CSS content into the message reduces or eliminates the need for the mobile communication device to request the attached CSS document, and for the mobile data server 120 to transmit the CSS document if and when requested by the device.

Interleaving CSS rules within the HTML body addresses several issues with the delivery of HTML-based email messages to mobile communication devices 201. Firstly, email message may not always be transmitted in its entirety to the mobile communication device 201. For example, depending on the mobile data delivery settings (for example, to reduce the data charges associated with mobile data delivery), only a fixed size portion of each message may be initially delivered, with the remainder or further portion of the message being sent only if the user requests it (for example, using either a "More" or "Auto-More" message request mechanism which requests the remainder or a further portion of the message from the mobile data server 120). Since the data in the HTML header applies to the entire document, there may be portions of the HTML header that only need to be sent if the remainder or further portion of the message is requested by the user. Interleaving removes CSS rules from the HTML header and adds the corresponding CSS rules in the HTML body (i.e., the CSS rules are moved). This reduces or avoids delivering CSS rules which are not used by the message portions which are sent to the mobile communication devices 201, and thereby reduces or eliminates the processing by the mobile communication devices 201 of CSS rules which are not used by the message portions sent. Note that interleaving CSS into the HTML body is not standards compliant, and thus also requires a mobile communication device 201 having an email message application or PIM manager application, and possibly a Web browser application if HTML having interleaved CSS content is to be delivered to the mobile communication device 201, that supports this non-standard structure.

Secondly, even if the entire HTML document is sent to the mobile communication device 201, it still has limited processing and memory resources. Thus, requiring the mobile communication device 201 to parse and process a header that applies to the entire document when only a small portion of the document is initially displayed on the display screen 242 is wasteful of device resources and may result in reduced performance such as delays in opening and viewing messages.

Thus, in view of the above it will be appreciated that the described operations reduce the processing required by one or both of the mobile data server 120 and mobile communication devices 201, and reduces the amount of data that needs to be transmitted to receive HTML formatted emails having attached CSS documents or linked CSS documents.

While the operations 400 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Furthermore, while the processing and optimization of HTML formatted email messages has been described as occurring on the mobile data server 120 in the above described embodiments, the operations 400 may be performed by the messaging server 132 in other embodiments. Moreover, while the embedding of CSS content has been described in the context of HTML formatted email messages, the teachings of the present disclosure may be applied to both the Standard Generalized Markup Language (SGML)-based HTML specification and the XML-based HTML specification (also referred to as Extensible HyperText Markup Language or XHTML). Moreover still, the teachings of the present disclosure may be applied to HTML content such as web pages which are transmitted to mobile communication devices 201 in the same manner as with HTML email messages, including all CSS and HTML optimizations on an HTML document with embedded CSS content which have been described above, and to other documents written in HTML and other kinds of Extensible Markup Language (XML) document.

The teachings of the present disclosure could be applied to optimize any document in any kind of markup language that allows for the separation of presentation ("styling") information from content, and which allows external references and inline specification of styling information. In this way, if provided with a first document which comprises content (data) in the markup language and a reference to a second (external) document which comprises style data in the same or different markup language, and if provided with the second document or access to the second document (if remotely located), the teachings of the present disclosure may be applied to embed the contents of the second document in the first document and to optionally further optimize the transformed code. This allows inline optimization of content for transmission, for example, over a limited capacity or expensive link to mobile communication devices 201.

In accordance with one embodiment of the present disclosure, there is provided a method for optimizing and delivering HyperText Markup Language (HTML) email messages to mobile communication devices, the method comprising: receiving an email message comprising an HTML portion comprising an HTML header and an HTML body; determining if the HTML header includes a reference to a Cascading Style Sheet (CSS) document comprising one or more rules; if the HTML header includes a reference to a CSS document, replacing the reference with the CSS rules of the CSS document, and sending the transformed email message to a destination mobile communication device.

In accordance with another embodiment of the present disclosure, there is provided a server for optimizing and delivering HyperText Markup Language (HTML) email messages to mobile communication devices, the server comprising: a controller comprising at least one processor for controlling the operation of the server; a communication subsystem connected to the controller for receiving and sending email messages to the mobile communication devices over a wireless network, the email messages including HTML email messages comprising an HTML portion comprising an HTML header and an HTML body; an optimization module connected to the controller, which configures the controller to receive HTML email messages, determine if the HTML header of the email messages include a reference to a Cascading Style Sheet (CSS) document comprising one or more rules, replace references in the email messages with the CSS rules of the respective CSS document, and send the transformed email messages to destination mobile communication devices.

In accordance with a further embodiment of the present disclosure, there is provided a method for optimizing and delivering content to mobile communication devices, the method comprising: receiving a first markup language document comprising content in a first markup language; determining if the first markup language document includes a reference to a second markup language document comprising style data in a second markup language; if the first markup language document includes a reference to a second markup language document comprising style data, replacing the reference with the style data of the second markup language document, and sending the transformed first markup language document to a destination mobile communication device. In some embodiments, the first markup language document is an email message. In some embodiments, the first markup language document is an HTML document, and the second document is a Cascading Style Sheet (CSS) document. The HTML document may be an email message comprising HTML content.

In accordance with a further embodiment of the present disclosure, there is provided a server for optimizing and delivering content to mobile communication devices, the server comprising: a controller comprising at least one processor for controlling the operation of the server; a communication subsystem connected to the controller for receiving and sending email messages to the mobile communication devices over a wireless network, the email messages including HTML email messages comprising an HTML portion comprising an HTML header and an HTML body; an optimization module connected to the controller, which configures the controller to receive first markup language documents comprising content in a first markup language, determine if the first markup language documents include a reference to a second markup language document comprising style data in a second markup language, replace the references with the style data of the second markup language document, and send the transformed first markup language documents to destination mobile communication devices.

In accordance with further embodiments of the present disclosure, there are provided a computer program product comprising a computer readable medium having stored thereon computer executable instructions comprising instructions for practising the methods of the application.

While the present disclosure is primarily described as a method, a person of ordinary skill in the art will understand that the present disclosure is also directed to various apparatus such as a mobile communication device and mobile data server for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method in a mobile data server, the method comprising:
   receiving an email message comprising a HyperText Markup Language (HTML) portion comprising an HTML header and an HTML body, wherein the HTML portion of the received email message includes a reference to a first Cascading Style Sheet (CSS) document and the first CSS document is separate from the HTML portion;
   modifying the HTML portion of the received email message to create a transformed email message, wherein modifying the HTML portion includes:
      adding one or more CSS rules from the first CSS document to the HTML portion;
      removing the reference to the first CSS document from the HTML portion;
      determining that a reference to a second CSS document is located in the email message outside of the HTML header; and
      moving the reference to the second CSS document to the HTML header; and
   sending the transformed email message to a destination mobile communication device.

2. The method of claim 1, wherein the first CSS document is attached to the received email message, and the reference to the first CSS document is a URI (Uniform Resource Identifier) which identifies the attached first CSS document.

3. The method of claim 1, wherein the first CSS document is located on a content server, and wherein the reference to the first CSS document is a URL (Uniform Resource Locator) which identifies the location of the first CSS document.

4. The method of claim 3, further comprising downloading the first CSS document from the content server in accordance with the URL identifying the location of the first CSS document.

5. The method of claim 1, wherein said one or more CSS rules is added to the HTML header in a style block.

6. The method of claim 1, further comprising one or any combination of: removing duplicate CSS rules from the HTML header, removing unreferenced CSS rules from the HTML header, and interleaving CSS rules from the HTML header into the HTML body of the message and removing the interleaved CSS rules from the HTML header.

7. The method of claim 1, further comprising: determining if the HTML header includes any duplicate CSS rules; and removing any duplicate CSS rules from the HTML header.

8. The method of claim 1, further comprising:
   determining if the HTML header includes CSS rules which are not referenced in the HTML body of the HTML portion of the email message to be sent to the destination mobile communication device; and
   removing any CSS rules from the HTML header which are not referenced in the HTML body of the HTML portion of the received email message.

9. The method of claim 1, further comprising:
   identifying a CSS reference to a CSS rule in the HTML body of the message;
   determining the CSS rule in the HTML header which corresponds to the CSS reference;
   adding the CSS rule to the HTML body of the message in a style block which precedes the CSS reference; and removing the CSS rule which was added to the HTML body from the HTML header.

10. The method of claim 1, further comprising:
sorting CSS rules into an order corresponding to an order in which the CSS rules are referenced in the HTML body;
determining groups of CSS rules from the sorted CSS rules in accordance with predetermined parameters; and
moving the groups of CSS rules into the HTML body into respective style blocks which precede the respective references to the CSS rules.

11. A server comprising:
a controller comprising at least one processor for controlling the operation of the server;
a communication subsystem connected to the controller for receiving an email message and sending a transformed email message to a mobile communication device over a wireless network, the received email message comprising a HyperText Markup Language (HTML) portion comprising an HTML header and an HTML body, wherein the HTML portion of the received email message includes a reference to a first Cascading Style Sheet (CSS) document and the first CSS document is separate from the HTML portion; and
an optimization module connected to the controller and adapted to modify the HTML portion of the received email message to create the transformed email message, wherein modifying the HTML portion includes:
adding one or more CSS rules from the first CSS document to the HTML portion;
removing the reference to the first CSS document from the HTML portion;
determining that a reference to a second CSS document is located in the email message outside of the HTML header; and
moving the reference to the second CSS document to the HTML header.

12. The server of claim 11,
wherein, in a first alternative, the first CSS document is attached to the received email message, and the reference to the first CSS document is a URI (Uniform Resource Identifier) which identifies the first CSS document attached to the received email message; or
wherein, in a second alternative, the optimization module is responsive to the reference to the first CSS document being a URL (Uniform Resource Locator identifying a location of the first CSS document on a content server, the optimization module being configured to download the first CSS document from the content server in accordance with the URL identifying the location of the first CSS document.

13. The server of claim 11, wherein the optimization module is adapted to add a style block comprising said one or more CSS rules from the first CSS document in the HTML header.

14. The server of claim 11, wherein the optimization module is adapted to perform further operations on the transformed email message comprising one or any combination of: removing duplicate CSS rules from the HTML header; removing unreferenced CSS rules from the HTML header; and interleaving CSS rules from the HTML header into the HTML body of the message and removing the interleaved CSS rules from the HTML header.

15. The server of claim 11, wherein the optimization module is adapted to determine if the HTML header includes any duplicate CSS rules, and remove any duplicate CSS rules from the HTML header.

16. The server of claim 11, wherein the optimization module is adapted to determine if the HTML header includes CSS rules which are not referenced in the HTML body of the received email message, and remove any CSS rules from the HTML header which are not referenced in the HTML body of the received email message.

17. The server of claim 11, wherein the optimization module is adapted to identify a CSS reference to a CSS rule in the HTML body of the message, determine the CSS rule in the HTML header which corresponds to the CSS reference, add the CSS rule to the HTML body of the message in a style block which precedes the CSS reference, and remove the CSS rule which was added to the HTML body from the HTML header.

18. A computer program product comprising a non-transitory computer readable storage medium having stored thereon computer executable instructions, the computer executable instructions comprising:
code for receiving an email message comprising a HyperText Markup Language (HTML) portion comprising an HTML header and an HTML body, wherein the HTML portion of the received email message includes a reference to a first Cascading Style Sheet (CSS) document and the first CSS document is separate from the HTML portion; and
code, responsive to the HTML portion including a reference to a first CSS document, for modifying the HTML portion of the received email message to create a transformed email message, wherein modifying the HTML portion includes:
adding one or more CSS rules from the first CSS document to the HTML portion;
removing the reference to the first CSS document from the HTML portion;
determining that a reference to a second CSS document is located in the email message outside of the HTML header; and
moving the reference to the second CSS document to the HTML header; and
code for sending the transformed email message to a destination mobile communication device.

* * * * *